US011799689B2

(12) United States Patent
Milescu et al.

(10) Patent No.: US 11,799,689 B2
(45) Date of Patent: *Oct. 24, 2023

(54) MULTIPATH TRAFFIC MANAGEMENT

(71) Applicant: Intel Corporation, Santa Clara, CA (US)

(72) Inventors: George Milescu, Bucharest (RO); Silviu Petria, Stilpeni (RO); Andra Paraschiv, Braila (RO)

(73) Assignee: Intel Corporation, Santa Clara, CA (US)

(*) Notice: Subject to any disclaimer, the term of this patent is extended or adjusted under 35 U.S.C. 154(b) by 187 days.

This patent is subject to a terminal disclaimer.

(21) Appl. No.: 17/353,233

(22) Filed: Jun. 21, 2021

(65) Prior Publication Data
US 2022/0014395 A1  Jan. 13, 2022

Related U.S. Application Data

(63) Continuation of application No. 15/756,924, filed as application No. PCT/IB2015/001841 on Sep. 28, 2015, now Pat. No. 11,063,785.

(51) Int. Cl.
*H04L 12/54* (2022.01)
*H04L 12/707* (2013.01)
(Continued)

(52) U.S. Cl.
CPC .......... *H04L 12/5601* (2013.01); *H04L 45/12* (2013.01); *H04L 45/24* (2013.01);
(Continued)

(58) Field of Classification Search
None
See application file for complete search history.

(56) References Cited

U.S. PATENT DOCUMENTS 7,551,623 B1   6/2009 Feroz et al.
8,612,612 B1 * 12/2013 Dukes .................. H04L 67/141
                                                    709/203
(Continued)

FOREIGN PATENT DOCUMENTS

EP        2759164      7/2014
WO      2014044333    3/2014
(Continued)

OTHER PUBLICATIONS

U.S. Appl. No. 15/756,924 U.S. Pat. No. 11,063,785, filed Mar. 1, 2018, Multipath Traffic Management.
(Continued)

*Primary Examiner* — Saba Tsegaye
(74) *Attorney, Agent, or Firm* — Schwegman Lundberg & Woessner, P.A.

(57) ABSTRACT

One embodiment provides an apparatus. The apparatus includes client traffic management (CTM) logic. The CTM logic is to trigger implementation of a selected network traffic flow related to the client device, the triggering based, at least in part, on a network traffic flow related to the client device. The network traffic flow is associated with a connection and includes at least one subflow. Each subflow is carried by a respective path associated with the connection. The triggering includes at least one of constraining and/or adjusting an allowable throughput at a service provider for one or more of the at least one subflow. The selected traffic policy is to be implemented in a transport layer.

25 Claims, 2 Drawing Sheets

(51) Int. Cl.
  H04L 45/24   (2022.01)
  H04L 47/283  (2022.01)
  H04L 47/20   (2022.01)
  H04L 45/12   (2022.01)
  H04L 45/00   (2022.01)
  H04L 12/70   (2013.01)
(52) U.S. Cl.
  CPC .............. *H04L 45/38* (2013.01); *H04L 47/20* (2013.01); *H04L 47/283* (2013.01); *H04L 2012/568* (2013.01); *H04L 2012/5627* (2013.01); *H04L 2012/5681* (2013.01); *H04L 2012/5684* (2013.01)

(56) References Cited

U.S. PATENT DOCUMENTS

| | | |
|---|---|---|
| 9,252,972 B1 * | 2/2016 | Dukes .................... H04L 47/10 |
| 11,063,785 B2 | 7/2021 | Milescu et al. |
| 2006/0126518 A1 | 6/2006 | Lee et al. |
| 2008/0219160 A1 | 9/2008 | Trinh et al. |
| 2012/0120798 A1 | 5/2012 | Jacquet et al. |
| 2012/0179652 A1 | 7/2012 | Glaude |
| 2015/0173084 A1 | 6/2015 | Chou et al. |
| 2015/0215225 A1 | 7/2015 | Mildh et al. |
| 2015/0263935 A1 | 9/2015 | Burbridge et al. |
| 2015/0382244 A1 | 12/2015 | Lau et al. |
| 2018/0248714 A1 | 8/2018 | Milescu et al. |

FOREIGN PATENT DOCUMENTS

| | | |
|---|---|---|
| WO | 2015030641 | 3/2015 |
| WO | 2017055887 | 4/2017 |

OTHER PUBLICATIONS

"U.S. Appl. No. 15/756,924, Non Final Office Action dated Apr. 17, 2020", 12 pgs.
"International Application Serial No. PCT IB2015 001841, International Search Report dated Jun. 28, 206", 5 pgs.
"International Application Serial No. PCT IB2015 001841, Written Opinion dated Jun. 28, 2016", 6 pgs.
"International Application Serial No. PCT IB2015 001841, International Prelimi?ary Report on Patentability dated Apr. 12, 2018", 8 pgs.
"U.S. Appl. No. 15/756,924, Preliminary Amendment filed Mar. 1, 2018", 6 pgs.
"U.S. Appl. No. 15/756,924, Non Final Office Action dated Mar. 21, 2019", 8 pgs.
"U.S. Appl. No. 15/756,924, Response filed Jul. 22, 2019 to Non Final Office Action dated Mar. 21, 2019", 7 pgs.
"U.S. Appl. No. 15/756,924, Final Office Action dated Oct. 24, 2019", 9 pgs.
"U.S. Appl. No. 15/756,924, Response filed Mar. 24, 2020 to Final Office Action dated Oct. 24, 2019", 9 pgs.
"U.S. Appl. No. 15/756,924, Examiner Interview Summary dated Feb. 10, 2020", 3 pgs.
"U.S. Appl. No. 15/756,924, Response filed Aug. 17, 2020 to Non Final Office Action dated Apr. 17, 2020", 12 pgs.
"U.S. Appl. No. 15/756,924, Final Office Action dated Nov. 20, 2020", 15 pgs.
"U.S. Appl. No. 15/756,924, Examiner Interview Summary dated Jan. 26, 2021", 3 pgs.
"U.S. Appl. No. 15/756,924, Response filed Feb. 22, 2021 to Final Office Action dated Nov. 20, 2020", 14 pgs.
"U.S. Appl. No. 15/756,924, Notice of Allowance dated Mar. 15, 2021", 8 pgs.
"U.S. Appl. No. 15/756,924, 312 Amendment filed May 25, 2021", 3 pgs.
"Application Serial No. 15/756,924, PTO Response to Rule 312 Communication dated Jun. 1, 2021", 2 pgs.
Curtis, Andrew R, "DevoFlow; Scaling Flow Management for High-Performance Networks", SIGCOMM. ACM. 2 Penn Plaza. Suite 701 New York NY 10121-0701 USA, (Aug. 15, 2011), 254-265.
Matthieu, Coudron, "Boosting Cloud Communications through a Crosslayer Multipath Protocol Architecture", 2013 IEEE Son for Future Networks and Services (SDN4FNS). IEEE., (Nov. 11, 2013), 9 pgs.

* cited by examiner

MULTIPATH TRAFFIC MANAGEMENT

PRIORITY CLAIM

This application is a continuation of U.S. patent application Ser. No. 15/756,924, filed Mar. 1, 2018, which is a U.S. National Stage Filing under 35 U.S.C. 371 from International Application No. PCT/IB2015/001841, filed Sep. 28, 2015, and published in English as WO 2017/055887 on Apr. 6, 2017. The contents of these applications are hereby incorporated by reference in their entireties.

FIELD

The present disclosure relates to traffic management, in particular to, multipath traffic management.

BACKGROUND

Client devices, such as mobile telephones, laptop computers and/or tablet computers, may be configured to communicate using a plurality of network interfaces. Each network interface may be configured to communicate using a selected communication protocol, for example, 3G, 4G and/or Wi-Fi®. The client devices may be further configured for multipath communication that allows multiple paths to be established for each connection. Network traffic may then be distributed across the paths.

Multipath communication may further include load balancing to distribute network traffic across network interfaces and/or subflows associated with each path. A service provider may provide policy information and interface handover settings related to traffic balancing to the client devices. Received policy information and interface handover (i.e., moving traffic from one network interface to another network interface) settings are configured to be processed by the client devices and applied locally by the client device. Thus, the client device is responsible for implementing the settings that may be received from the service provider.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
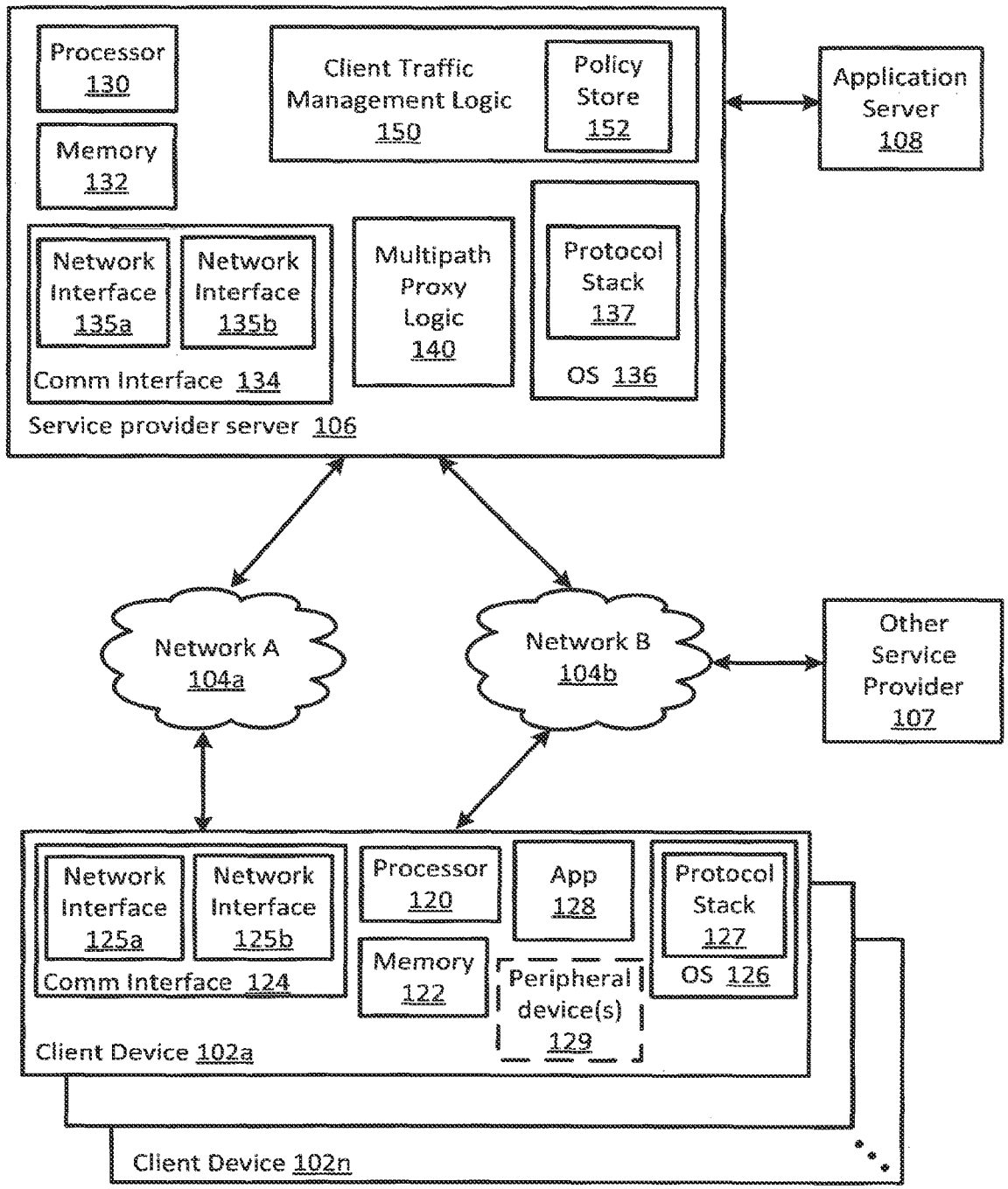
FIG. 1 illustrates a functional block diagram of a multipath traffic management system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Reception of the policy information and/or handover settings is not guaranteed nor is client device cooperation in implementing received policy information and/or handover settings. The service provider may send the policy information and handover settings periodically and thus, the received policy information and/or handover settings may not reflect a current state of the network. Further, providing such information and settings may create additional communication overhead for the network and additional communication and processing for the client device. The additional communication overhead and processing by the client device corresponds to increased power consumption by the client device.

Generally, this disclosure relates to multipath traffic management. An apparatus, method and/or system are configured to trigger implementation of a traffic policy at a client device based, at least in part, on a network traffic flow related to the client device. The implementation of the traffic policy may be triggered by constraining and/or adjusting allowable throughput (i.e., bandwidth) at a service provider server for one or more subflows related to a connection. The traffic policy may then be implemented at the client device by a traffic balancing function in response to a change in congestion level detected by the client device. Thus, the traffic management may be implemented in a transport layer (i.e., layer 4). The change in congestion level is related to the adjustment in allowable throughput (e.g., data rate). Thus, a service provider may manage network traffic according to one or more traffic policies.

A multipath traffic management system includes client traffic management (CTM) logic resident at the service provider. The CTM logic is configured to capture flow data from, for example, multipath proxy logic included in a service provider server. The CTM logic may then identify a selected network traffic flow and/or subflow and select a corresponding traffic policy related to the network traffic flow and/or subflow. The CTM logic may then trigger implementation of the selected traffic policy for a selected subflow. In an embodiment, the implementation may be triggered by adjusting allowable throughput for the selected subflow. For example, the allowable throughput for the selected subflow may be decreased, i.e., rate limited. Continuing with this example, the allowable throughput for the selected subflow may be later increased, i.e., the rate limit may be removed. In another embodiment, traffic of a selected type (i.e., traffic class) may be prevented from communication on a selected network interface and/or port by reducing allowable throughput (i.e., rate limiting) for a network traffic flow or subflow related to that network interface and/or port to at or near zero. Thus, a path associated with a subflow may be effectively eliminated without closing an associated connection.

The client device is configured to detect the change in allowable throughput for the network traffic flow and/or subflow. A multipath load balancing function resident in the client device may then adjust distribution of network traffic across one or more flow(s) and/or subflow(s). Load balancing may be configured to maintain congestion at generally uniform levels across a plurality of network interfaces (and/or ports). A volume of network traffic transmitted via a network interface associated with the selected network traffic flow and/or subflow may be adjusted. For example, the volume of network traffic may be reduced and/or eliminated in response to a reduction in allowable throughput (i.e., rate limiting). The volume of network traffic may be later increased if the rate limiting is later removed.

Thus, reception and cooperation in implementation by the client device of the traffic policy and/or interface handover conditions are not required. Communication overhead related to transmitting the traffic policy and/or interface handover conditions may be avoided. Power consumption related to receiving and processing the received traffic policy and/or interface handover conditions may be avoided.

Throughput may be adjusted in real-time in response to current network conditions. Thus, a selected traffic policy may be implemented that corresponds to current network conditions utilizing traffic balancing functionality in the client device.

FIG. 1 illustrates a functional block diagram of a multipath traffic management system 100 consistent with several embodiments of the present disclosure. Multipath traffic management system 100 may include one or more client devices 102a, . . . , 102n, one or more network(s) 104a, 104b, a service provider server 106 and an application server 108. Multipath traffic management system 100 may further include an other service provider 107.

Client devices, e.g., client device 102a, may include, but are not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

Service provider server 106 may include one or more computing systems. Similarly, other service provider 107 may include one or more computing systems. For example, service provider server 106 and/or other service provider 107 may correspond to an internet service provider (ISP). In another example, service provider server 106 and/or other service provider 107 may correspond to a mobile telephone service provider. The service providers may thus provide connectivity to a plurality of client devices. The connectivity may be subject to one or more service level agreements (SLA)s related to network traffic, as described herein.

Networks 104a, 104b may include, but are not limited to, mobile (e.g., cellular) telephone networks, cable systems configured to provide internet, telephone and/or television service, local area networks (LANs), wide area networks (WANs), etc. Networks 104a, 104b may include wired and/or wireless links. For example, network 104a may correspond to a mobile telephone network that may comply and/or be compatible with a 3G and/or a 4G protocol and network 104b be may correspond to a wireless network that may comply and/or be compatible with an IEEE 802.11 (e.g., Wi-Fi®) communication protocol, as described herein.

Client device(s), e.g., client device 102a, and service provider server 106 are configured for multipath communication. Client device(s) 102a, . . . , 102n and service provider server 106 may comply and/or be compatible with a multipath communication protocol, for example, a multipath transport control protocol (MP TCP), as described herein. In non-multipath, i.e., single path, communication, a connection may be established between two endpoints, e.g., client device 102a and service provider server 106, and network traffic may then flow along a single path between the endpoints. The connection corresponds to respective network interfaces associated with each endpoint and the path that includes network device(s), e.g., routers, between the endpoints. The connection may be broken by action of the endpoints and/or due to a fault (e.g., loss of communication on a link) along the path.

In multipath communication, a connection is established between two endpoints and the connection may include a plurality of paths. In other words, the plurality of paths may be associated with one connection. The plurality of paths may traverse one or more networks, e.g., network(s) 104a and/or 104b. A network traffic flow associated with the connection may then be divided into one or more subflow(s) and each subflow may be carried by a respective path. As used herein, network traffic flow corresponds to the flow of network traffic associated with a connection. A network traffic flow may include one or more subflows. A multipath connection may exist as long as at least one associated path exists. Thus, a loss of a path in multipath communication may or may not result in a broken connection.

Network traffic may include a plurality of packets that each includes a header and a payload. The header typically includes control information (e.g., source and destination address information) and the payload generally includes data being transmitted. Network traffic may be classified into a plurality of traffic classes that correspond to a type of information being transmitted in the associated network traffic flow. SLA parameter(s) may be related to traffic class, as described herein. Traffic classes may include, but are not limited to, voice, interactive video, non-interactive video and/or data transfers (e.g., file transfers, application downloads, email traffic, web browsing, etc.). Information included in the header may be used to identify a flow and/or traffic class for a packet. Analysis of the payload may also be utilized to identify a traffic class.

Client device 102a includes a processor 120, memory 122 and a communication interface 124 and may include one or more peripheral device(s) 129. Processor 120 may include, but is not limited to, single core (i.e., processing unit) processor, a multicore processor, a microprocessor, a microcontroller, an application specific integrated circuit (ASIC), application specific instruction processor (ASIP), etc. Processor 120 is configured to perform operations of client device 102a. Peripheral devices 129 may include, for example, user interface device(s) including a display, a touch-screen display, keypad, keyboard, etc., sensor(s) including accelerometer, global positioning system (GPS), gyroscope, etc., storage device(s) including hard disk drives, solid-state drives, removable storage media, etc.

Communication interface 124 includes one or more network interfaces 125a, 125b. The network interfaces 125a, 125b are configured to couple client device 102a to one or more networks, e.g., networks 104a, 104b. Each network interface 125a, 125b corresponds to a physical interface and may be related to one or more logical ports. Network interfaces 125a, 125b may comply and/or be compatible with one or more communication protocols, as described herein.

Client device 102a includes an operating system (OS) 126 and may include one or more application(s), e.g. App 128. The OS 126 is configured to manage operations of client device 102a. The OS 126 may include may include a multipath-enabled protocol stack 127 configured to manage multipath communication for client device 102a. The multipath-enabled protocol stack 127 may be configured to implement one or more multipath communication protocols, as described herein.

The App 128 may be configured to communicate voice, video and/or data with application server 108, as described herein. Processor 120 may be configured to execute App 128. It may be transparent to an application, e.g., app 128, associated with the network traffic, that a connection is multipath.

Service provider server 106 includes a processor 130, memory 132 and a communication interface 134. Service provider server 106 may include an operating system OS 136 that includes a multipath-enabled protocol stack 137. Processor 130 may include one or more core(s) and is configured to perform operations of service provider server 106. Communication interface 134 includes one or more network interfaces 135a, 135b. The network interfaces 135a, 123b are configured to couple service provider server 106 to one or more networks, e.g., networks 104a, 104b. Communication interface 134 and network interfaces 135a, 135b may comply and/or be compatible with one or more communication protocols, as described herein.

Service provider server 106 includes multipath proxy logic 140. Multipath proxy logic 140 may be included in protocol stack 137. Multipath proxy logic 140 may comply and/or be compatible with one or more multipath protocols (e.g., MP TCP), as described herein. Multipath proxy logic 140 is configured to provide multipath traffic management. Multipath proxy logic 140 may be configured to monitor and/or control multipath connections, flows and/or subflows for service provider server 106. The multipath connections may include communication interface 134, e.g., network interface(s) 135a and/or 135b. In other words, paths related to the flows and/or subflows include communication interface 134 and network interface(s) 135a and/or 135b. Multipath proxy logic 140 is further configured to integrate subflows received from, e.g., client device 102a to generate a corresponding flow. The subflows may be received via one or more of network interface(s) 135a and/or 135b. Multipath proxy logic 140 may then direct the corresponding flow to a destination, e.g., application server 108. Thus, existence of the subflows may be transparent to application server 108.

Service provider server 106 may be coupled to application server 108 and/or to other service provider 107. For example, application server 108 may correspond to a destination for a connection with client device 102a. Other service provider 107 may be included in a path related to the connection. For example, service provider server 106 may be associated with network 104a and other service provider 107 may be associated with network 104b. Service provider server 106 and other service provider 107 may be independent ISPs. Continuing with this example, multipath proxy logic 140 may be configured to integrate subflows received from networks 104a and/or 104b and/or other service provider 107.

Service provider server 106 includes client traffic management (CTM) logic 150. CTM logic includes policy store 152. Policy store 152 is configured to store policy information. The policy information may be associated with one or more client device(s), e.g., client device 102a, address (e.g., source, destination, port identifier) and/or path information (e.g., associated communication protocol) and/or traffic class. Policy information may include, but is not limited to, application-based policy, congestion-based policy and/or SLA-based policy.

Application-based policies include, but are not limited to, policies related to type of network traffic and/or quality of service (QoS). An application-based policy may relate traffic management options to network traffic class. For example, an application-based policy for video traffic may be configured to limit throughput and/or cause such traffic to use a network interface associated with a selected communication protocol to improve latency and/or meet a QoS target.

Congestion-based policies include, but are not limited to, policies related to congestion. A congestion-based policy may relate traffic management options to congestion level. Congestion level corresponds to congestion associated with a path, e.g., a subflow. Congestion level may be related to round trip time (RTT) for the path. For example, a congestion-based policy may be configured to trigger moving at least a portion of network traffic to another subflow in response to detecting congestion above a threshold on a selected subflow. The traffic moved may be related to a selected application (i.e., network port), a selected network interface and/or a selected client device.

SLA-based policies include, but are not limited to, policies related to SLA parameters. For example, SLA parameters may include a minimum QoS, a maximum round trip time (RTT), a minimum throughput (i.e., allowable bandwidth), a maximum loss rate, a maximum amount of data in a time period (e.g., a data plan), etc. At least some of the SLA parameters may be related to congestion level, i.e., congestion associated with a path. The maximum and minimum values may be related to traffic class. For example, SLA parameters may include a maximum total volume of network traffic in a time period (e.g., day, week, month) and/or a maximum volume of network traffic in each of one or more traffic class(es) in the time period. The maximum volume(s) of network traffic may be associated with one or more client device(s). For example, the one or more client device(s) may be related to an SLA with a selected client.

An SLA policy may relate traffic management options to one or more SLA parameters. For example, an SLA-based policy may be configured to trigger moving at least a portion of traffic from a selected subflow to another subflow in response to detecting an SLA parameter above a maximum threshold or below a minimum threshold on the selected subflow. For example, detecting an RTT greater than the maximum RTT for a selected path may be configured to trigger moving at least a portion of the network traffic from the selected subflow to another path. The traffic moved may be selected based, at least in part, on an associated a traffic class, a selected application (i.e., network port), a selected network interface and/or a selected client device. For example, a traffic class may be associated with a port identifier.

CTM logic 150 is configured to capture flow data from multipath proxy logic 140. The flow data may be associated with a network traffic flow. The network traffic flow may be received and/or transmitted via communication interface 134 and network interface(s) 135a and/or 135b. The flow data may be associated with each connection and/or each subflow associated with a connection. Flow data may include, but is not limited to, information included in a packet header (e.g., source address, destination address, source port, destination port, time information (e.g., a timestamp, a time to live), sequence information), traffic class (i.e., traffic type), send and receive buffer states and/or congestion information. Flow data may further include multipath flow data. Multipath flow data may include, but is not limited to, subflow sequence number, a data (i.e., global) sequence number that may be used to reassemble data from one or more subflows into one flow, a checksum, etc. The CTM logic 150 is configured to identify a network traffic flow and/or a subflow based, at least in part, on the captured flow data. For example, a network traffic flow and/or a subflow may be identified based, at least in part, on header data including, for example, source and/or destination address and/or a port identifier.

The CTM logic 150 may be configured to determine throughput and/or round trip time (RTT) for an identified network traffic flow and/or subflow based, at least in part, on captured flow data. For example, throughput may be determined based, at least in part, on time information and/or sequence information. In another example, throughput may be determined based, at least in part, on fill level of receive buffers associated with communication interface 134. RTT may be determined based, at least in part, on time information and/or sequence information related to acknowledgements.

The CTM logic 150 may then be configured to select a traffic management policy related to the identified network traffic flow. The traffic management policy may be selected from policy store 152. The traffic policy may be selected based, at least in part, on a selected subflow identifier and/or the determined throughput and/or RTT. The CTM logic 150 may then be configured to trigger implementation of the selected traffic policy. For example, the implementation may be triggered by constraining an allowable throughput (i.e., allowable bandwidth) on one or more subflows associated with a selected connection. In another example, the implementation may be triggered by restricting a flow and/or subflow to packets associated with a selected traffic class.

Allowable throughput may be constrained using one or more traffic control functions. Traffic control functions include, but are not limited to, traffic policing, traffic shaping and/or dropping packets. The traffic control function(s) may be applied by CTM logic 150 and/or multipath proxy logic 140. Traffic control functions may be applied to a network interface, e.g., network interface 135a, 135b, and/or to one or more port(s) associated with a selected network interface, e.g., one or more port(s) associated with network interface 135a or 135b. For example, the traffic control functions may be applied by multipath proxy logic 140 and/or CTM logic 150. Applying a traffic control function to a selected port may correspond to applying the traffic control function to a selected traffic class. Traffic policing and/or traffic shaping may include rate limiting, i.e., limiting allowable throughput. Traffic policing is configured to limit a data rate on ingress by dropping received packets that arrive at service provider server 106 via communication interface 134 at a rate greater than a maximum allowable rate. Traffic shaping is configured to limit a data rate on egress by managing a rate at which packets are scheduled for transmission (e.g., egress) from service provider server 106, e.g., from network interface(s) 135a and/or 135b. Allowable throughput may be constrained by limiting a data rate (e.g., bits per second, bytes per second) associated with ingress or egress. Limiting an ingress data rate, i.e., traffic policing, may result in an increase in dropped packets. Limiting an egress data rate may result in increased occupancy of a transmit buffer at service provider server 106 related to communication interface 134.

Changes in allowable throughput constraints (i.e., changes in rate limiting) may appear to the client device 102a as a change in congestion levels. The client device 102a, e.g., the multipath enabled protocol stack 127, may adjust associated load balancing in response to the perceived change in congestion levels, thus, implementing the selected traffic policy. Thus, the traffic management may be implemented in a transport layer (i.e., layer 4) of the protocol stack 127. For example, limiting allowable throughput on a target flow to a relatively low data rate, e.g., less than one kilobits per second, may result in little or no network traffic from the client device on the network interface associated with the target flow. Such relatively low data rate (i.e., throughput) may then result in a connection with little or no network traffic without breaking the connection. Reducing the data rate to at or near zero without breaking an associated connection allows relatively fast response times. In other words, overhead associating with later reestablishing a connection and/or overhead associated with breaking down a connection may be avoided.

Thus, CTM logic resident in a service provider server may capture flow data from, for example, multipath proxy logic included in the service provider server. The CTM logic may then identify a selected network traffic flow and/or subflow and select a corresponding traffic policy related to the identified network traffic flow and/or subflow. The CTM logic may then trigger implementation of the selected traffic policy for a selected subflow. For example, the implementation may be triggered by adjusting allowable throughput (i.e., adjusting rate limiting) for the selected subflow. Continuing with this example, a reduction in allowable throughput may later be followed by an increase in allowable throughput, e.g., in response to a change in captured flow data. The client device is configured to detect the change(s) in allowable throughput for the network traffic flow and/or subflow. A multipath load balancing function resident in the client device may then adjust distribution of network traffic across one or more network traffic flow(s) and/or subflow(s). A volume of network traffic transmitted via a network interface associated with the selected network traffic flow and/or subflow may then be adjusted.

Figure 2:
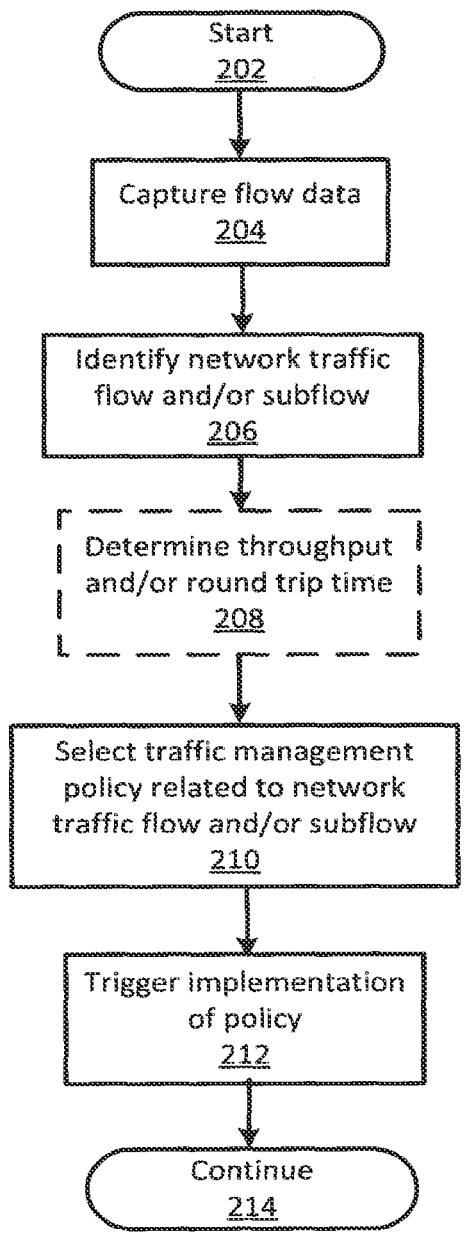
FIG. 2 is a flowchart of multipath traffic management operations according to various embodiments of the present disclosure.

FIG. 2 is a flowchart 200 of multipath traffic management operations according to various embodiments of the present disclosure. In particular, the flowchart 200 illustrates triggering implementation of a traffic management policy. The operations may be performed, for example, by CTM logic 150 of FIG. 1.

Operations of this embodiment may begin with start 202. Flow data may be captured at operation 204. For example, flow data may be captured from multipath proxy logic 140 by CTM logic 150. A network traffic flow and/or subflow may be identified at operation 206. The network traffic flow and/or subflow may be identified based, at least in part, on the captured flow data. In some embodiments, a throughput and/or round trip time (RTT) may be determined at operation 208. A traffic management policy related to the network traffic flow and/or subflow may be selected at operation 210. The traffic management policy may be application-based, congestion-based and/or SLA-based, as described herein. Implementation of the traffic management policy may be triggered at operation 212. For example, implementation of the traffic policy may be implemented by adjusting an allowable throughput related to the identified flow and/or one or more selected subflow(s). Program flow may then continue at operation 214.

Thus, implementation of a traffic management policy by a client device may be triggered by a service provider server.

While the flowchart of FIG. 2 illustrates operations according to various embodiments, it is to be understood that not all of the operations depicted in FIG. 2 are necessary for other embodiments. In addition, it is fully contemplated herein that in other embodiments of the present disclosure, the operations depicted in FIG. 2, and/or other operations described herein may be combined in a manner not specifically shown in any of the drawings, and such embodiments may include less or more operations than are illustrated in FIG. 2. Thus, claims directed to features and/or operations that are not exactly shown in one drawing are deemed within the scope and content of the present disclosure.

Thus, an apparatus, method and/or system are configured to trigger implementation of a traffic policy at a client device based, at least in part, on a network traffic flow related to the client device. The implementation of the traffic policy may be triggered by constraining and/or adjusting allowable throughput (i.e., bandwidth) at a service provider server for one or more subflows related to a connection. The traffic policy may then be implemented at the client device by a traffic balancing function in response to a change in congestion level detected by the client device. The change in congestion level is related to the adjustment in allowable throughput (e.g., data rate) at the service provider server. Thus, a service provider may manage network traffic according to one or more traffic policies.

CTM logic is configured to capture flow data from, for example, multipath proxy logic. The CTM logic may then identify a selected network traffic flow and/or subflow and select a corresponding traffic policy related to the identified flow and/or subflow. The CTM logic may then trigger implementation of the identified traffic policy for a selected subflow. In an embodiment, the implementation may be triggered by adjusting allowable throughput for the selected subflow. For example, the allowable throughput for the selected subflow may be decreased, i.e., rate limited. Continuing with this example, the allowable throughput for the selected subflow may be later increased, i.e., the rate limit may be removed. In another embodiment, traffic of a selected type (i.e., traffic class) may be prevented from communication on a selected network interface and/or port by reducing allowable throughput for a flow or subflow related to that network interface and/or port to at or near zero. The client device is configured to detect the change in allowable throughput for the network traffic flow and/or subflow. A multipath load balancing function resident in the client device may then adjust distribution of network traffic across one or more flow(s) and/or subflow(s). A volume of network traffic transmitted via a network interface associated with the selected rate limited flow and/or rate limited subflow may then be reduced and/or eliminated.

Thus, reception and cooperation in implementation by the client device of the traffic policy and/or interface handover conditions are not required. Communication overhead related to transmitting the traffic policy and/or interface handover conditions may be avoided. Power consumption related to receiving and processing the received traffic policy and/or interface handover conditions may be avoided. Throughput may be adjusted in real-time in response to current network conditions. Thus, a selected traffic policy may be implemented that corresponds to current network conditions utilizing traffic balancing functionality in the client device.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., client device(s) 102a, . . . , 102n and/or service provider server 106. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks, e.g., protocol stacks 127, 137. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Network(s) 104a and/or 104b may include a packet switched network. Client device(s) 102a, . . . , 102n, service provider server 106, other service provider 107 and/or network(s) 104a and/or 104b may be capable of communicating with each other using a selected packet switched network communications protocol. One example communications protocol may include an Ethernet communications protocol which may be capable permitting communication using a Transmission Control Protocol/internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, client device(s) 102a, . . . , 102n, service provider server 106, other service provider 107 and/or network(s) 104a and/or 104b may be capable of communicating with each other using an X.25 communications protocol. The X.25 communications protocol may comply or be compatible with a standard promulgated by the International Telecommunication Union-Telecommunication Standardization Sector (ITU-T).

Alternatively or additionally, client device(s) 102a, . . . , 102n, service provider server 106, other service provider 107 and/or network(s) 104a and/or 104b may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, client device(s) 102a, . . . , 102n, service provider server 106, other service provider 107 and/or network(s) 104a and/or 104b may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or afterdeveloped connection-oriented network communication protocols are equally contemplated herein.

Client devices 102a, . . . , 102n, service provide server 106 and/or other service provider 107 may be configured to communicate via networks 104a, 104b using one or more multipath-related communication protocols. For example, client device(s) 102a, . . . , 102n, service provider server 106, other service provider 107 and/or network(s) 104a and/or 104b may comply and/or be compatible with Internet Engineering Task Force (IETF) Experimental Request for Comments (RFC) 6824, titled TCP Extensions for Multipath Operation with Multiple Addresses, published January 2013, and/or later and/or related versions of this RFC.

Client device(s) 102a, . . . , 102n, service provider server 106, other service provider 107 and/or network(s) 104a and/or 104b may comply and/or be compatible with one or more communication specifications, standards and/or protocols.

For example, client device(s) 102a, . . . , 102n, service provider server 106, other service provider 107 and/or network(s) 104a and/or 104b may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, client device(s) 102a, . . . , 102n, service provider server 106, other service provider 107 and/or network(s) 104a and/or 104b may comply and/or be compatible with IEEE (Institute of Electrical and Electronics Engineers) 802.15.4-2006 standard titled: IEEE Standard for Information technology—Telecommunications and information exchange between systems-Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, client device(s) 102a, . . . , 102n, service provider server 106, other service provider 107 and/or network(s) 104a and/or 104b may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, client device(s) 102a, . . . , 102n, service provider server 106, other service provider 107 and/or network(s) 104a and/or 104b may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

Client device(s) 102a, . . . , 102n, service provider server 106, other service provider 107 and/or network(s) 104a and/or 104b may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, client device(s) 102a, . . . , 102n, service provider server 106, other service provider 107 and/or network(s) 104a and/or 104b may comply and/or be compatible with one or more CDMA (Code Division Multiple Access) 2000 standard(s) and/or later and/or related versions of these standards including, for example, CDMA2000 1×RTT, IX Advanced and/or CDMA2000 1×EV-DO (Evolution-Data Optimized): Release 0, Revision A, Revision B, Ultra Mobile Broadband (UMB). In another example, client device(s) 102a, . . . , 102n, service provider server 106, other service provider 107 and/or network(s) 104a and/or 104b may comply and/or be compatible with UMTS (Universal Mobile Telecommunication System) standard and/or later and/or related versions of these standards.

Client device(s) 102a, . . . , 102n, service provider server 106, other service provider 107 and/or network(s) 104a and/or 104b may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, client device(s) 102a, . . . , 102n, service provider server 106, other service provider 107 and/or network(s) 104a and/or 104b may comply and/or be compatible with IEEE standard: IEEE Std 802.16™-2012, title: IEEE Standard for Air Interface for Broadband Wireless Access Systems, released August 2012, and/or related and/or later versions of this standard. In another example, client device(s) 102a, . . . , 102n, service provider server 106, other service provider 107 and/or network(s) 104a and/or 104b may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Memory 122, 132 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, an apparatus, method and/or system are configured to trigger implementation of a traffic policy at a client device based, at least in part, on a network flow related to the client device. The implementation of the traffic policy may be triggered by constraining and/or adjusting allowable throughput (i.e., bandwidth) at a service provider server for one or more subflows related to a connection. The traffic policy may then be implemented at the client device by a traffic balancing function in response to a change in congestion level detected by the client device. Thus, the traffic management may be implemented in a transport layer (i.e., layer 4). The change in congestion level is related to the adjustment in allowable throughput (e.g., data rate). Thus, a service provider may manage network traffic according to one or more traffic policies.

Thus, reception and cooperation in implementation by the client device of the traffic policy and/or interface handover conditions are not required. Communication overhead related to transmitting the traffic policy and/or interface handover conditions may be avoided. Power consumption related to receiving and processing the received traffic policy and/or interface handover conditions may be avoided. Throughput may be adjusted in real-time in response to current network conditions. Thus, a selected traffic policy may be implemented that corresponds to current network conditions utilizing traffic balancing functionality in the client device.

EXAMPLES

Examples of the present disclosure include subject material such as a method, means for performing acts of the method, a device, or of an apparatus or system related to client traffic management, as discussed below.

Example 1 According to this example, there is provided an apparatus. The apparatus includes client traffic management (CTM) logic to trigger implementation of a selected traffic management policy by a client device, the triggering based, at least in part, on a network traffic flow related to the client device.

Example 2 This example includes the elements of example 1, wherein the CTM logic is further to select the traffic policy based, at least in part, on the network traffic flow.

Example 3 This example includes the elements of example 1, wherein the CTM logic is further to capture flow data related to the network traffic flow.

Example 4 This example includes the elements of example 1, wherein the CTM logic is further to at least one of identify the network traffic flow and/or identify a subflow related to the network traffic flow.

Example 5 This example includes the elements according to any one of examples 1 through 4, wherein the CTM logic is further to determine at least one of a throughput and/or a round trip time associated with the network traffic flow.

Example 6 This example includes the elements according to any one of examples 1 through 4, wherein the network traffic flow is multipath.

Example 7 This example includes the elements according to any one of examples 1 through 4, wherein the traffic management policy includes one or more of an application-based policy, a congestion-based policy and/or a service level agreement (SLA)-based policy.

Example 8 This example includes the elements according to any one of examples 1 through 4, wherein the network traffic flow includes at least one subflow.

Example 9 This example includes the elements according to any one of examples 1 through 4, wherein the network traffic flow includes a plurality of subflows.

Example 10 This example includes the elements according to any one of examples 1 through 4, wherein the triggering includes at least one of constraining and/or adjusting an allowable throughput at a service provider server.

Example 11 This example includes the elements of example 10, wherein a change in congestion level at the client device is related to the at least one of constraining and/or adjusting the allowable throughput at the service provider server.

Example 12 This example includes the elements of example 10, wherein the at least one of constraining and/or adjusting the allowable throughput includes implementing rate limiting.

Example 13 This example includes the elements of example 10, wherein the at least one of constraining and/or adjusting the allowable throughput includes decreasing the allowable throughput for a selected subflow.

Example 14 This example includes the elements of example 13, wherein the at least one of constraining and/or adjusting the allowable throughput further includes increasing the allowable throughput for the selected subflow.

Example 15 This example includes the elements of example 10, wherein the triggering includes constraining the allowable throughput using a traffic control function.

Example 16 This example includes the elements of example 15, wherein the traffic control function is selected from the group including traffic policing, traffic shaping and dropping packets.

Example 17 This example includes the elements of example 15, wherein the traffic control function is applied to at least one of a network interface and/or a port associated with the network interface.

Example 18 This example includes the elements of example 17, wherein applying the traffic control function to the port corresponds to applying the traffic control function to a selected traffic class.

Example 19 This example includes the elements according to any one of examples 1 through 4, wherein the traffic policy is configured to be implemented by a traffic balancing function at the client device.

Example 20 This example includes the elements according to any one of examples 1 through 4, wherein the selected traffic management policy is implemented in a transport layer.

Example 21 This example includes the elements of example 3, wherein the flow data is captured from multipath proxy logic.

Example 22 This example includes the elements of example 6, wherein the network traffic flow is divided into a plurality of subflows.

Example 23 This example includes the elements of example 22, wherein each subflow of the plurality of subflows is carried by a respective path.

Example 24 This example includes the elements of example 22, wherein the plurality of subflows are associated with a connection.

Example 25 This example includes the elements according to any one of examples 1 through 4, wherein the network traffic flow corresponds to at least one traffic class.

Example 26 This example includes the elements of example 25, wherein the at least one traffic class is selected from the group including voice, interactive video, non-interactive video and data transfers.

Example 27 This example includes the elements according to any one of examples 1 through 4, wherein the network traffic flow includes a plurality of packets, each packet including a header and a payload.

Example 28 This example includes the elements of example 27, wherein the CTM logic is to at least one of identify the network traffic flow and/or identify a subflow related to the network traffic flow based, at least in part, on information included in the header.

Example 29 This example includes the elements of example 27, wherein the CTM logic is to identify a traffic class for a packet based, at least in part, on information included in the header.

Example 30 This example includes the elements of example 27, wherein the CTM logic is to identify a traffic class for a packet based, at least in part, on an analysis of the payload.

Example 31 This example includes the elements according to any one of examples 1 through 4, wherein the traffic management policy includes an application-based policy.

Example 32 This example includes the elements of example 31, wherein the application-based policy includes a policy related to at least one of a type of network traffic and/or a quality of service (QoS).

Example 33 This example includes the elements of example 31, wherein the application-based policy relates a traffic management option to a network traffic class.

Example 34 This example includes the elements according to any one of examples 1 through 4, wherein the traffic management policy includes a congestion-based policy.

Example 35 This example includes the elements of example 34, wherein the congestion-based policy relates a traffic management option to a congestion level.

Example 36 This example includes the elements of example 34, wherein the congestion-based policy is configured to trigger moving at least a portion of the network traffic flow to a first subflow in response to detecting congestion above a threshold on a second subflow.

Example 37 This example includes the elements of example 36, wherein the network traffic moved is related to at least one of a selected application, a selected network interface and/or a selected client device.

Example 38 This example includes the elements according to any one of examples 1 through 4, wherein the traffic management policy includes a service level agreement (SLA)-based policy.

Example 39 This example includes the elements of example 38, wherein the SLA-based policy includes a policy related to one or more SLA parameters.

Example 40 This example includes the elements of example 39, wherein each SLA parameter is selected from the group including a minimum quality of service, a maximum round-trip time, a minimum throughput, a maximum loss rate and a maximum amount of data in a time period.

Example 41 This example includes the elements of example 39, wherein at least one SLA parameter is related to a congestion level.

Example 42 This example includes the elements of example 39, wherein at least one of a maximum value of a first SLA parameter and/or a minimum value of a second SLA parameter is related to a traffic class.

Example 43 This example includes the elements of example 39, wherein at least one SLA parameter is selected from the group including a maximum total volume of network traffic in a first time period and a maximum volume of network traffic in each of one or more traffic classes in a second time period.

Example 44 This example includes the elements of example 38, wherein the SLA-based policy is configured to trigger moving at least a portion of traffic from a first subflow to a second subflow in response to detecting an SLA parameter above a maximum threshold or below a minimum threshold on the first subflow.

Example 45 This example includes the elements of example 44, wherein the traffic moved is selected based, at least in part, on one or more of an associated traffic class, a selected application, a selected network interface and/or a selected client device.

Example 46 This example includes the elements of example 3, wherein the flow data is associated with at least one of the network traffic flow, a connection and/or a subflow associated with the connection.

Example 47 This example includes the elements of example 46, wherein the flow data includes at least one of information included in a packet header, a traffic class, a send buffer state, a receive buffer state, and/or congestion information.

Example 48 This example includes the elements of example 47, wherein the information included in the packet header includes one or more of a source address, a destination address, a source port, a destination port, time information and/or sequence information.

Example 49 This example includes the elements of example 46, wherein the flow data includes multipath flow data.

Example 50 This example includes the elements of example 49, wherein the multipath flow data includes at least one of a subflow sequence number, a global sequence number and/or a checksum.

Example 51 This example includes the elements of example 5, wherein at least one of the throughput and/or the round-trip time is determined based, at least in part, on captured flow data.

Example 52 This example includes the elements of example 51, wherein the captured flow data includes one or more of time information, sequence information and/or a fill level of receive buffers associated with a communication interface.

Example 53 This example includes the elements of example 2, wherein the traffic policy is selected based, at least in part, on at least one of a selected subflow identifier, a determined throughput, and/or a round-trip time.

Example 54 According to this example, there is provided a method. The method includes triggering, by client traffic management (CTM) logic, implementation of a selected traffic management policy by a client device, the triggering based, at least in part, on a network traffic flow related to the client device.

Example 55 This example includes the elements of example 54, further including selecting, by the CTM logic, the traffic policy based, at least in part, on the network traffic flow.

Example 56 This example includes the elements of example 54, further including capturing, by the CTM logic, flow data related to the network traffic flow.

Example 57 This example includes the elements of example 54, further including identifying, by the CTM logic, at least one of the network traffic flow and/or a subflow related to the network traffic flow.

Example 58 This example includes the elements of example 54, further including determining, by the CTM logic, at least one of a throughput and/or a round trip time associated with the network traffic flow.

Example 59 This example includes the elements of example 54, wherein the network traffic flow is multipath.

Example 60 This example includes the elements of example 54, wherein the traffic management policy includes one or more of an application-based policy, a congestion-based policy and/or a service level agreement (SLA)-based policy.

Example 61 This example includes the elements of example 54, wherein the network traffic flow includes at least one subflow.

Example 62 This example includes the elements of example 54, wherein the network traffic flow includes a plurality of subflows.

Example 63 This example includes the elements of example 54, wherein the triggering includes at least one of constraining and/or adjusting an allowable throughput at a service provider server.

Example 64 This example includes the elements of example 63, wherein a change in congestion level at the client device is related to the at least one of constraining and/or adjusting the allowable throughput at the service provider server.

Example 65 This example includes the elements of example 63, wherein the at least one of constraining and/or adjusting the allowable throughput includes implementing rate limiting.

Example 66 This example includes the elements of example 63, wherein the at least one of constraining and/or adjusting the allowable throughput includes decreasing the allowable throughput for a selected subflow.

Example 67 This example includes the elements of example 66, wherein the at least one of constraining and/or adjusting the allowable throughput further includes increasing, by the CTM logic, the allowable throughput for the selected subflow.

Example 68 This example includes the elements of example 63, wherein the triggering includes constraining the allowable throughput using a traffic control function.

Example 69 This example includes the elements of example 68, wherein the traffic control function is selected from the group including traffic policing, traffic shaping and dropping packets.

Example 70 This example includes the elements of example 68, further including applying, by at least one of the CTM logic and/or multipath proxy logic, the traffic control function to at least one of a network interface and/or a port associated with the network interface.

Example 71 This example includes the elements of example 70, wherein applying the traffic control function to the port corresponds to applying the traffic control function to a selected traffic class.

Example 72 This example includes the elements of example 54, wherein the traffic policy is configured to be implemented by a traffic balancing function at the client device.

Example 73 This example includes the elements of example 54, wherein the selected traffic management policy is implemented in a transport layer.

Example 74 This example includes the elements of example 56, wherein the flow data is captured from multipath proxy logic.

Example 75 This example includes the elements of example 59, wherein the network traffic flow is divided into a plurality of subflows.

Example 76 This example includes the elements of example 75, wherein each subflow of the plurality of subflows is carried by a respective path.

Example 77 This example includes the elements of example 75, wherein the plurality of subflows are associated with a connection.

Example 78 This example includes the elements of example 54, wherein the network traffic flow corresponds to at least one traffic class.

Example 79 This example includes the elements of example 78, wherein the at least one traffic class is selected from the group including voice, interactive video, non-interactive video and data transfers.

Example 80 This example includes the elements of example 54, wherein the network traffic flow includes a plurality of packets, each packet including a header and a payload.

Example 81 This example includes the elements of example 80, further including identifying, by the CTM logic, at least one of the network traffic flow and/or a subflow related to the network traffic flow based, at least in part, on information included in the header.

Example 82 This example includes the elements of example 80, further including identifying, by the CTM logic, a traffic class for a packet based, at least in part, on information included in the header.

Example 83 This example includes the elements of example 80, further including identifying, by the CTM logic, a traffic class for a packet based, at least in part, on an analysis of the payload.

Example 84 This example includes the elements of example 54, wherein the traffic management policy includes an application-based policy.

Example 85 This example includes the elements of example 84, wherein the application-based policy includes a policy related to at least one of a type of network traffic and/or a quality of service (QoS).

Example 86 This example includes the elements of example 84, wherein the application-based policy relates a traffic management option to a network traffic class.

Example 87 This example includes the elements of example 54, wherein the traffic management policy includes a congestion-based policy.

Example 88 This example includes the elements of example 87, wherein the congestion-based policy relates a traffic management option to a congestion level.

Example 89 This example includes the elements of example 87, wherein the congestion-based policy is configured to trigger moving at least a portion of the network traffic flow to a first subflow in response to detecting congestion above a threshold on a second subflow.

Example 90 This example includes the elements of example 89, wherein the network traffic moved is related to at least one of a selected application, a selected network interface and/or a selected client device.

Example 91 This example includes the elements of example 54, wherein the traffic management policy includes a service level agreement (SLA)-based policy.

Example 92 This example includes the elements of example 91, wherein the SLA-based policy includes a policy related to one or more SLA parameters.

Example 93 This example includes the elements of example 92, wherein each SLA parameter is selected from the group including a minimum quality of service, a maximum round-trip time, a minimum throughput, a maximum loss rate and a maximum amount of data in a time period.

Example 94 This example includes the elements of example 92, wherein at least one SLA parameter is related to a congestion level.

Example 95 This example includes the elements of example 92, wherein at least one of a maximum value of a first SLA parameter and/or a minimum value of a second SLA parameter is related to a traffic class.

Example 96 This example includes the elements of example 92, wherein at least one SLA parameter is selected from the group including a maximum total volume of network traffic in a first time period and a maximum volume of network traffic in each of one or more traffic classes in a second time period.

Example 97 This example includes the elements of example 91, wherein the SLA-based policy is configured to trigger moving at least a portion of traffic from a first subflow to a second subflow in response to detecting an SLA parameter above a maximum threshold or below a minimum threshold on the first subflow.

Example 98 This example includes the elements of example 97, wherein the traffic moved is selected based, at least in part, on one or more of an associated traffic class, a selected application, a selected network interface and/or a selected client device.

Example 99 This example includes the elements of example 56, wherein the flow data is associated with at least one of the network traffic flow, a connection and/or a subflow associated with the connection.

Example 100 This example includes the elements of example 99, wherein the flow data includes at least one of information included in a packet header, a traffic class, a send buffer state, a receive buffer state, and/or congestion information.

Example 101 This example includes the elements of example 100, wherein the information included in the packet header includes one or more of a source address, a destination address, a source port, a destination port, time information and/or sequence information.

Example 102 This example includes the elements of example 99, wherein the flow data includes multipath flow data.

Example 103 This example includes the elements of example 102, wherein the multipath flow data includes at least one of a subflow sequence number, a global sequence number and/or a checksum.

Example 104 This example includes the elements of example 58, wherein at least one of the throughput and/or the round-trip time is determined based, at least in part, on captured flow data.

Example 105 This example includes the elements of example 104, wherein the captured flow data includes one or more of time information, sequence information and/or a fill level of receive buffers associated with a communication interface.

Example 106 This example includes the elements of example 55, wherein the traffic policy is selected based, at least in part, on at least one of a selected subflow identifier, a determined throughput, and/or a round-trip time.

Example 107 According to this example, there is provided a system. The system includes a service provider server. The service provider service includes a processor; a communication interface; multipath proxy logic; and client traffic management (CTM) logic. The CTM logic is to trigger implementation of a selected traffic management policy by a client device, the triggering based, at least in part, on a network traffic flow related to the client device.

Example 108 This example includes the elements of example 107, wherein the CTM logic is further to select the traffic policy based, at least in part, on the network traffic flow.

Example 109 This example includes the elements of example 107, wherein the CTM logic is further to capture flow data related to the network traffic flow from the multipath proxy logic.

Example 110 This example includes the elements of example 107, wherein the CTM logic is further to at least one of identify the network traffic flow and/or identify a subflow related to the network traffic flow.

Example 111 This example includes the elements according to any one of examples 107 through 110, wherein the CTM logic is further to determine at least one of a throughput and/or a round trip time associated with the network traffic flow.

Example 112 This example includes the elements according to any one of examples 107 through 110, wherein the network traffic flow is multipath.

Example 113 This example includes the elements according to any one of examples 107 through 110, wherein the traffic management policy includes one or more of an application-based policy, a congestion-based policy and/or a service level agreement (SLA)-based policy.

Example 114 This example includes the elements according to any one of examples 107 through 110, wherein the network traffic flow includes at least one subflow.

Example 115 This example includes the elements according to any one of examples 107 through 110, wherein the network traffic flow includes a plurality of subflows.

Example 116 This example includes the elements according to any one of examples 107 through 110, wherein the triggering includes at least one of constraining and/or adjusting an allowable throughput at the service provider server.

Example 117 This example includes the elements of example 116, wherein a change in congestion level at the client device is related to the at least one of constraining and/or adjusting the allowable throughput at the service provider server.

Example 118 This example includes the elements of example 116, wherein the at least one of constraining and/or adjusting the allowable throughput includes implementing rate limiting.

Example 119 This example includes the elements of example 116, wherein the at least one of constraining and/or adjusting the allowable throughput includes decreasing the allowable throughput for a selected subflow.

Example 120 This example includes the elements of example 119, wherein the at least one of constraining and/or adjusting the allowable throughput further includes increasing the allowable throughput for the selected subflow.

Example 121 This example includes the elements of example 116, wherein the triggering includes constraining the allowable throughput using a traffic control function.

Example 122 This example includes the elements of example 121, wherein the traffic control function is selected from the group including traffic policing, traffic shaping and dropping packets.

Example 123 This example includes the elements of example 121, wherein the communication interface includes a network interface and the traffic control function is applied to at least one of the network interface and/or a port associated with the network interface.

Example 124 This example includes the elements of example 123, wherein applying the traffic control function to the port corresponds to applying the traffic control function to a selected traffic class.

Example 125 This example includes the elements according to any one of examples 107 through 110, wherein the traffic policy is configured to be implemented by a traffic balancing function at the client device.

Example 126 This example includes the elements according to any one of examples 107 through 110, wherein the selected traffic management policy is implemented in a transport layer.

Example 127 This example includes the elements of example 109, wherein the flow data is captured from the multipath proxy logic.

Example 128 This example includes the elements of example 112, wherein the network traffic flow is divided into a plurality of subflows.

Example 129 This example includes the elements of example 128, wherein each subflow of the plurality of subflows is carried by a respective path.

Example 130 This example includes the elements of example 128, wherein the plurality of subflows are associated with a connection.

Example 131 This example includes the elements according to any one of examples 107 through 110, wherein the network traffic flow corresponds to at least one traffic class.

Example 132 This example includes the elements of example 131, wherein the at least one traffic class is selected from the group including voice, interactive video, non-interactive video and data transfers.

Example 133 This example includes the elements according to any one of examples 107 through 110, wherein the network traffic flow includes a plurality of packets, each packet including a header and a payload.

Example 134 This example includes the elements of example 133, wherein the CTM logic is to at least one of identify the network traffic flow and/or identify a subflow related to the network traffic flow based, at least in part, on information included in the header.

Example 135 This example includes the elements of example 133, wherein the CTM logic is to identify a traffic class for a packet based, at least in part, on information included in the header.

Example 136 This example includes the elements of example 133, wherein the CTM logic is to identify a traffic class for a packet based, at least in part, on an analysis of the payload.

Example 137 This example includes the elements according to any one of examples 107 through 110, wherein the traffic management policy includes an application-based policy.

Example 138 This example includes the elements of example 137, wherein the application-based policy includes a policy related to at least one of a type of network traffic and/or a quality of service (QoS).

Example 139 This example includes the elements of example 137, wherein the application-based policy relates a traffic management option to a network traffic class.

Example 140 This example includes the elements according to any one of examples 107 through 110, wherein the traffic management policy includes a congestion-based policy.

Example 141 This example includes the elements of example 140, wherein the congestion-based policy relates a traffic management option to a congestion level.

Example 142 This example includes the elements of example 140, wherein the congestion-based policy is configured to trigger moving at least a portion of the network traffic flow to a first subflow in response to detecting congestion above a threshold on a second subflow.

Example 143 This example includes the elements of example 142, wherein the network traffic moved is related to at least one of a selected application, a selected network interface and/or a selected client device.

Example 144 This example includes the elements according to any one of examples 107 through 110, wherein the traffic management policy includes a service level agreement (SLA)-based policy.

Example 145 This example includes the elements of example 144, wherein the SLA-based policy includes a policy related to one or more SLA parameters.

Example 146 This example includes the elements of example 145, wherein each SLA parameter is selected from the group including a minimum quality of service, a maximum round-trip time, a minimum throughput, a maximum loss rate and a maximum amount of data in a time period.

Example 147 This example includes the elements of example 145, wherein at least one SLA parameter is related to a congestion level.

Example 148 This example includes the elements of example 145, wherein at least one of a maximum value of a first SLA parameter and/or a minimum value of a second SLA parameter is related to a traffic class.

Example 149 This example includes the elements of example 145, wherein at least one SLA parameter is selected from the group including a maximum total volume of network traffic in a first time period and a maximum volume of network traffic in each of one or more traffic classes in a second time period.

Example 150 This example includes the elements of example 144, wherein the SLA-based policy is configured to trigger moving at least a portion of traffic from a first subflow to a second subflow in response to detecting an SLA parameter above a maximum threshold or below a minimum threshold on the first subflow.

Example 151 This example includes the elements of example 150, wherein the traffic moved is selected based, at least in part, on one or more of an associated traffic class, a selected application, a selected network interface and/or a selected client device.

Example 152 This example includes the elements of example 109, wherein the flow data is associated with at least one of the network traffic flow, a connection and/or a subflow associated with the connection.

Example 153 This example includes the elements of example 152, wherein the flow data includes at least one of information included in a packet header, a traffic class, a send buffer state, a receive buffer state, and/or congestion information.

Example 154 This example includes the elements of example 153, wherein the information included in the packet header includes one or more of a source address, a destination address, a source port, a destination port, time information and/or sequence information.

Example 155 This example includes the elements of example 152, wherein the flow data includes multipath flow data.

Example 156 This example includes the elements of example 155, wherein the multipath flow data includes at least one of a subflow sequence number, a global sequence number and/or a checksum.

Example 157 This example includes the elements of example 111, wherein at least one of the throughput and/or the round-trip time is determined based, at least in part, on captured flow data.

Example 158 This example includes the elements of example 157, wherein the captured flow data includes one or more of time information, sequence information and/or a fill level of receive buffers associated with the communication interface.

Example 159 This example includes the elements of example 108, wherein the traffic policy is selected based, at least in part, on at least one of a selected subflow identifier, a determined throughput, and/or a round-trip time.

Example 160 According to this example, there is provided a computer readable storage device. The computer readable storage device has stored thereon instructions that when executed by one or more processors result in the following operations including triggering implementation of a selected traffic management policy by a client device, the triggering based, at least in part, on a network traffic flow related to the client device.

Example 161 This example includes the elements of example 160, wherein the instructions that when executed by one or more processors results in the following additional operations including selecting the traffic policy based, at least in part, on the network traffic flow.

Example 162 This example includes the elements of example 160, wherein the instructions that when executed by one or more processors results in the following additional operations including capturing flow data related to the network traffic flow.

Example 163 This example includes the elements of example 160, wherein the instructions that when executed by one or more processors results in the following additional operations including identifying at least one of the network traffic flow and/or a subflow related to the network traffic flow.

Example 164 This example includes the elements according to any one of examples 160 through 163, wherein the instructions that when executed by one or more processors results in the following additional operations including determining at least one of a throughput and/or a round trip time associated with the network traffic flow.

Example 165 This example includes the elements according to any one of examples 160 through 163, wherein the network traffic flow is multipath.

Example 166 This example includes the elements according to any one of examples 160 through 163, wherein the traffic management policy includes one or more of an application-based policy, a congestion-based policy and/or a service level agreement (SLA)-based policy.

Example 167 This example includes the elements according to any one of examples 160 through 163, wherein the network traffic flow includes at least one subflow.

Example 168 This example includes the elements according to any one of examples 160 through 163, wherein the network traffic flow includes a plurality of subflows.

Example 169 This example includes the elements according to any one of examples 160 through 163, wherein the triggering includes at least one of constraining and/or adjusting an allowable throughput at a service provider server.

Example 170 This example includes the elements of example 169, wherein the change in congestion level at the client device is related to the at least one of constraining and/or adjusting the allowable throughput at the service provider server.

Example 171 This example includes the elements of example 169, wherein at least one of constraining and/or adjusting the allowable throughput includes implementing rate limiting.

Example 172 This example includes the elements of example 169, wherein at least one of constraining and/or adjusting the allowable throughput includes decreasing the allowable throughput for a selected subflow.

Example 173 This example includes the elements of example 172, wherein at least one of constraining and/or adjusting the allowable throughput further includes increasing the allowable throughput for the selected subflow.

Example 174 This example includes the elements of example 169, wherein the triggering includes constraining the allowable throughput using a traffic control function.

Example 175 This example includes the elements of example 174, wherein the traffic control function is selected from the group including traffic policing, traffic shaping and dropping packets.

Example 176 This example includes the elements of example 174, wherein the instructions that when executed by one or more processors results in the following additional operations including applying the traffic control function to at least one of a network interface and/or a port associated with the network interface.

Example 177 This example includes the elements of example 176, wherein applying a traffic control function to the port corresponds to applying the traffic control function to a selected traffic class.

Example 178 This example includes the elements according to any one of examples 160 through 163, wherein the traffic policy is configured to be implemented by a traffic balancing function at the client device.

Example 179 This example includes the elements according to any one of examples 160 through 163, wherein the selected traffic management policy is implemented in a transport layer.

Example 180 This example includes the elements of example 162, wherein the flow data is captured from multipath proxy logic.

Example 181 This example includes the elements of example 165, wherein the network traffic flow is divided into a plurality of subflows.

Example 182 This example includes the elements of example 181, wherein each subflow of a plurality of subflows is carried by a respective path.

Example 183 This example includes the elements of example 181, wherein the plurality of subflows are associated with a connection.

Example 184 This example includes the elements according to any one of examples 160 through 163, wherein the network traffic flow corresponds to at least one traffic class.

Example 185 This example includes the elements of example 184, wherein at least one traffic class is selected from the group including voice, interactive video, non-interactive video and data transfers.

Example 186 This example includes the elements according to any one of examples 160 through 163, wherein the network traffic flow includes a plurality of packets, each packet including a header and a payload.

Example 187 This example includes the elements of example 186, wherein the instructions that when executed by one or more processors results in the following additional operations including identifying at least one of the network traffic flow and/or a subflow related to the network traffic flow based, at least in part, on information included in the header.

Example 188 This example includes the elements of example 186, wherein the instructions that when executed by one or more processors results in the following additional operations including identifying a traffic class for a packet based, at least in part, on information included in the header.

Example 189 This example includes the elements of example 186, wherein the instructions that when executed by one or more processors results in the following additional operations including identifying a traffic class for a packet based, at least in part, on an analysis of the payload.

Example 190 This example includes the elements according to any one of examples 160 through 163, wherein the traffic management policy includes an application-based policy.

Example 191 This example includes the elements of example 190, wherein an application-based policy includes a policy related to at least one of a type of network traffic and/or a quality of service (QoS).

Example 192 This example includes the elements of example 190, wherein an application-based policy relates a traffic management option to a network traffic class.

Example 193 This example includes the elements according to any one of examples 160 through 163, wherein the traffic management policy includes a congestion-based policy.

Example 194 This example includes the elements of example 193, wherein the congestion-based policy relates a traffic management option to a congestion level.

Example 195 This example includes the elements of example 193, wherein the congestion-based policy is configured to trigger moving at least a portion of the network traffic flow to a first subflow in response to detecting congestion above a threshold on a second subflow.

Example 196 This example includes the elements of example 195, wherein the network traffic moved is related to at least one of a selected application, a selected network interface and/or a selected client device.

Example 197 This example includes the elements according to any one of examples 160 through 163, wherein the traffic management policy includes a service level agreement (SLA)-based policy.

Example 198 This example includes the elements of example 197, wherein the SLA-based policy includes a policy related to one or more SLA parameters.

Example 199 This example includes the elements of example 198, wherein each SLA parameter is selected from the group including a minimum quality of service, a maximum round-trip time, a minimum throughput, a maximum loss rate and a maximum amount of data in a time period.

Example 200 This example includes the elements of example 198, wherein at least one SLA parameter is related to a congestion level.

Example 201 This example includes the elements of example 198, wherein at least one of a maximum value of a first SLA parameter and/or a minimum value of a second SLA parameter is related to a traffic class.

Example 202 This example includes the elements of example 198, wherein at least one SLA parameter is selected from the group including a maximum total volume of network traffic in a first time period and a maximum volume of network traffic in each of one or more traffic classes in a second time period.

Example 203 This example includes the elements of example 197, wherein the SLA-based policy is configured to trigger moving at least a portion of traffic from a first subflow to a second subflow in response to detecting an SLA parameter above a maximum threshold or below a minimum threshold on the first subflow.

Example 204 This example includes the elements of example 203, wherein the traffic moved is selected based, at least in part, on one or more of an associated traffic class, a selected application, a selected network interface and/or a selected client device.

Example 205 This example includes the elements of example 162, wherein the flow data is associated with at least one of the network traffic flow, a connection and/or a subflow associated with the connection.

Example 206 This example includes the elements of example 205, wherein the flow data includes at least one of information included in a packet header, a traffic class, a send buffer state, a receive buffer state, and/or congestion information.

Example 207 This example includes the elements of example 206, wherein information included in the packet header includes one or more of a source address, a destination address, a source port, a destination port, time information and/or sequence information.

Example 208 This example includes the elements of example 205, wherein the flow data includes multipath flow data.

Example 209 This example includes the elements of example 208, wherein the multipath flow data includes at least one of a subflow sequence number, a global sequence number and/or a checksum.

Example 210 This example includes the elements of example 164, wherein at least one of the throughput and/or the round-trip time is determined based, at least in part, on captured flow data.

Example 211 This example includes the elements of example 210, wherein the captured flow data includes one or more of time information, sequence information and/or a fill level of receive buffers associated with a communication interface.

Example 212 This example includes the elements of example 161, wherein the traffic policy is selected based, at least in part, on at least one of a selected subflow identifier, a determined throughput, and/or a round-trip time.

Example 213 According to this example, there is provided a device. The device includes means for triggering, by client traffic management (CTM) logic, implementation of a selected traffic management policy by a client device, the triggering based, at least in part, on a network traffic flow related to the client device.

Example 214 This example includes the elements of example 213, further including means for selecting, by the CTM logic, the traffic policy based, at least in part, on the network traffic flow.

Example 215 This example includes the elements of example 213, further including means for capturing, by the CTM logic, flow data related to the network traffic flow.

Example 216 This example includes the elements of example 213, further including means for identifying, by the CTM logic, at least one of the network traffic flow and/or a subflow related to the network traffic flow.

Example 217 This example includes the elements according to any one of examples 213 through 216, further including means for determining, by the CTM logic, at least one of a throughput and/or a round trip time associated with the network traffic flow.

Example 218 This example includes the elements according to any one of examples 213 through 216, wherein the network traffic flow is multipath.

Example 219 This example includes the elements according to any one of examples 213 through 216, wherein the traffic management policy includes one or more of an application-based policy, a congestion-based policy and/or a service level agreement (SLA)-based policy.

Example 220 This example includes the elements according to any one of examples 213 through 216, wherein the network traffic flow includes at least one subflow.

Example 221 This example includes the elements according to any one of examples 213 through 216, wherein the network traffic flow includes a plurality of subflows.

Example 222 This example includes the elements according to any one of examples 213 through 216, wherein the triggering includes at least one of constraining and/or adjusting an allowable throughput at a service provider server.

Example 223 This example includes the elements of example 222, wherein a change in congestion level at the client device is related to the at least one of constraining and/or adjusting the allowable throughput at the service provider server.

Example 224 This example includes the elements of example 222, wherein the at least one of constraining and/or adjusting the allowable throughput includes implementing rate limiting.

Example 225 This example includes the elements of example 222, wherein the at least one of constraining and/or adjusting the allowable throughput includes decreasing the allowable throughput for a selected subflow.

Example 226 This example includes the elements of example 225, wherein the at least one of constraining and/or adjusting the allowable throughput further includes means for increasing, by the CTM logic, the allowable throughput for the selected subflow.

Example 227 This example includes the elements of example 222, wherein the triggering includes constraining the allowable throughput using a traffic control function.

Example 228 This example includes the elements of example 227, wherein the traffic control function is selected from the group including traffic policing, traffic shaping and dropping packets.

Example 229 This example includes the elements of example 227, further including means for applying, by at least one of the CTM logic and/or multipath proxy logic, the traffic control function to at least one of a network interface and/or a port associated with the network interface.

Example 230 This example includes the elements of example 229, wherein applying the traffic control function to the port corresponds to applying the traffic control function to a selected traffic class.

Example 231 This example includes the elements according to any one of examples 213 through 216, wherein the traffic policy is configured to be implemented by a traffic balancing function at the client device.

Example 232 This example includes the elements according to any one of examples 213 through 216, wherein the selected traffic management policy is implemented in a transport layer.

Example 233 This example includes the elements of example 215, wherein the flow data is captured from multipath proxy logic.

Example 234 This example includes the elements of example 218, wherein the network traffic flow is divided into a plurality of subflows.

Example 235 This example includes the elements of example 234, wherein each subflow of the plurality of subflows is carried by a respective path.

Example 236 This example includes the elements of example 234, wherein the plurality of subflows are associated with a connection.

Example 237 This example includes the elements according to any one of examples 213 through 216, wherein the network traffic flow corresponds to at least one traffic class.

Example 238 This example includes the elements of example 237, wherein the at least one traffic class is selected from the group including voice, interactive video, non-interactive video and data transfers.

Example 239 This example includes the elements according to any one of examples 213 through 216, wherein the network traffic flow includes a plurality of packets, each packet including a header and a payload.

Example 240 This example includes the elements of example 239, further including means for identifying, by the CTM logic, at least one of the network traffic flow and/or a subflow related to the network traffic flow based, at least in part, on information included in the header.

Example 241 This example includes the elements of example 239, further including means for identifying, by the CTM logic, a traffic class for a packet based, at least in part, on information included in the header.

Example 242 This example includes the elements of example 239, further including means for identifying, by the CTM logic, a traffic class for a packet based, at least in part, on an analysis of the payload.

Example 243 This example includes the elements according to any one of examples 213 through 216, wherein the traffic management policy includes an application-based policy.

Example 244 This example includes the elements of example 243, wherein the application-based policy includes a policy related to at least one of a type of network traffic and/or a quality of service (QoS).

Example 245 This example includes the elements of example 243, wherein the application-based policy relates a traffic management option to a network traffic class.

Example 246 This example includes the elements according to any one of examples 213 through 216, wherein the traffic management policy includes a congestion-based policy.

Example 247 This example includes the elements of example 246, wherein the congestion-based policy relates a traffic management option to a congestion level.

Example 248 This example includes the elements of example 246, wherein the congestion-based policy is configured to trigger moving at least a portion of the network traffic flow to a first subflow in response to detecting congestion above a threshold on a second subflow.

Example 249 This example includes the elements of example 248, wherein the network traffic moved is related to at least one of a selected application, a selected network interface and/or a selected client device.

Example 250 This example includes the elements according to any one of examples 213 through 216, wherein the traffic management policy includes a service level agreement (SLA)-based policy.

Example 251 This example includes the elements of example 250, wherein the SLA-based policy includes a policy related to one or more SLA parameters.

Example 252 This example includes the elements of example 251, wherein each SLA parameter is selected from the group including a minimum quality of service, a maximum round-trip time, a minimum throughput, a maximum loss rate and a maximum amount of data in a time period.

Example 253 This example includes the elements of example 251, wherein at least one SLA parameter is related to a congestion level.

Example 254 This example includes the elements of example 251, wherein at least one of a maximum value of a first SLA parameter and/or a minimum value of a second SLA parameter is related to a traffic class.

Example 255 This example includes the elements of example 251, wherein at least one SLA parameter is selected from the group including a maximum total volume of network traffic in a first time period and a maximum volume of network traffic in each of one or more traffic classes in a second time period.

Example 256 This example includes the elements of example 250, wherein the SLA-based policy is configured to trigger moving at least a portion of traffic from a first subflow to a second subflow in response to detecting an SLA parameter above a maximum threshold or below a minimum threshold on the first subflow.

Example 257 This example includes the elements of example 256, wherein the traffic moved is selected based, at least in part, on one or more of an associated traffic class, a selected application, a selected network interface and/or a selected client device.

Example 258 This example includes the elements of example 215, wherein the flow data is associated with at least one of the network traffic flow, a connection and/or a subflow associated with the connection.

Example 259 This example includes the elements of example 258, wherein the flow data includes at least one of information included in a packet header, a traffic class, a send buffer state, a receive buffer state, and/or congestion information.

Example 260 This example includes the elements of example 259, wherein the information included in the packet header includes one or more of a source address, a destination address, a source port, a destination port, time information and/or sequence information.

Example 261 This example includes the elements of example 258, wherein the flow data includes multipath flow data.

Example 262 This example includes the elements of example 261, wherein the multipath flow data includes at least one of a subflow sequence number, a global sequence number and/or a checksum.

Example 263 This example includes the elements of example 217, wherein at least one of the throughput and/or the round-trip time is determined based, at least in part, on captured flow data.

Example 264 This example includes the elements of example 263, wherein the captured flow data includes one or more of time information, sequence information and/or a fill level of receive buffers associated with a communication interface.

Example 265 This example includes the elements of example 214, wherein the traffic policy is selected based, at least in part, on at least one of a selected subflow identifier, a determined throughput, and/or a round-trip time.

Example 266 According to this example, there is provided a system. The system includes at least one device arranged to perform the method of any one of claims 54 to 106.

Example 267 According to this example, there is provided a device. The device includes means to perform the method of any one of claims 54 to 106.

Example 268 A computer readable storage device having stored thereon instructions that when executed by one or more processors result in the following operations including: This example includes the elements according to any one of examples 54 through 106.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A computing node to implement a network management entity in at least one communication network, the node comprising:
   network interface circuitry; and
   processing circuitry coupled to the network interface circuitry, the processing circuitry configured to:
   sense using the network interface circuitry at the network management entity, network traffic on a network connection, the network connection configured between at least a first computing device and at least a second computing device of the at least one communication network;
   determine at least one characteristic associated with the network traffic on the network connection;
   identify a network traffic flow associated with the network traffic, the network traffic flow comprising a plurality of subflows of the network connection;
   select, based on the at least one characteristic of the network traffic on the network connection, a subflow of the plurality of subflows of the network connection and a configuration policy from a plurality of available configuration policies; and
   trigger implementation of the configuration policy on a subset of the network traffic, the subset of the network traffic including network data of the selected subflow of the plurality of subflows, the implementation performed at the network management entity without transmission of the configuration policy to the first computing device and the second computing device.

2. The computing node of claim 1, wherein the processing circuitry is further configured to:
   determine the at least one characteristic using a header information of the network data sensed via the network interface circuitry.

3. The computing node of claim 2, wherein the at least one characteristic in the header information comprises one or more of:
   source address information associated with the first computing device or the second computing device;
   destination address information;
   source port information;
   destination port information; and
   packet timing information.

4. The computing node of claim 3, wherein the processing circuitry is further configured to:
   identify the network traffic flow based on the source port information or the destination port information.

5. The computing node of claim 3, wherein the header information further comprises:

multipath flow information, the multipath flow information including a subflow sequence number for each subflow of the plurality of subflows.

6. The computing node of claim 5, wherein the processing circuitry is further configured to:
    determine the at least one characteristic for each subflow of the plurality of subflows based on the subflow sequence number; and
    wherein operations to select the subflow are based on the determined at least one characteristic for each subflow of the plurality of subflows.

7. The computing node of claim 3, wherein the at least one characteristic associated with the network traffic comprises at least one of:
    throughput of the network connection during communication of the network traffic; and
    round trip time (RTT) associated with the network traffic.

8. The computing node of claim 7, wherein the computing node further comprises at least one communication buffer coupled to the network interface circuitry, and the processing circuitry is further configured to:
    determine the throughput of the network connection during communication of the network traffic based on buffer status of the at least one communication buffer.

9. The computing node of claim 7, wherein the processing circuitry is further configured to:
    determine the RTT based on the packet timing information.

10. The computing node of claim 1, wherein the configuration policy is one of:
    an application-based policy associated with a type of network traffic of the network traffic flow;
    a congestion-based policy associated with congestion for the network traffic flow; or
    a service level agreement (SLA)-based policy associated with SLA parameters specified for the network traffic flow by an SLA.

11. An at least one non-transitory machine-readable storage medium including instructions, wherein the instructions, when executed by a processing circuitry of a network management entity in at least one communication network, cause the processing circuitry to perform operations comprising:
    sensing using network interface circuitry at the network management entity, network traffic on a network connection, the network connection configured between at least a first computing device and at least a second computing device of the at least one communication network;
    determining at least one characteristic associated with the network traffic on the network connection;
    identifying a network traffic flow associated with the network traffic, the network traffic flow comprising a plurality of subflows of the network connection;
    selecting, based on the at least one characteristic of the network traffic on the network connection, a subflow of the plurality of subflows of the network connection and a configuration policy from a plurality of available configuration policies; and
    triggering implementation of the configuration policy on a subset of the network traffic, the subset of the network traffic including network data of the selected subflow of the plurality of subflows, the implementation performed at the network management entity without transmission of the configuration policy to the first computing device and the second computing device.

12. The at least one non-transitory machine-readable storage medium of claim 11, the operations further comprising:
    determining the at least one characteristic using a header information of the network data sensed via the network interface circuitry.

13. The at least one non-transitory machine-readable storage medium of claim 12, wherein the at least one characteristic in the header information comprises one or more of:
    source address information associated with the first computing device or the second computing device;
    destination address information;
    source port information;
    destination port information; and
    packet timing information.

14. The at least one non-transitory machine-readable storage medium of claim 13, the operations further comprising:
    identifying the network traffic flow based on the source port information or the destination port information.

15. The at least one non-transitory machine-readable storage medium of claim 13, wherein the header information further comprises:
    multipath flow information, the multipath flow information including a subflow sequence number for each subflow of the plurality of subflows.

16. The at least one non-transitory machine-readable storage medium of claim 15, the operations further comprising:
    determining the at least one characteristic for each subflow of the plurality of subflows based on the subflow sequence number; and
    wherein operations to select the subflow are based on the determined at least one characteristic for each subflow of the plurality of subflows.

17. The at least one non-transitory machine-readable storage medium of claim 13, wherein the at least one characteristic associated with the network traffic comprises at least one of:
    throughput of the network connection during communication of the network traffic; and
    round trip time (RTT) associated with the network traffic.

18. The at least one non-transitory machine-readable storage medium of claim 17, wherein the network management entity further comprises at least one communication buffer coupled to the network interface circuitry, and the operations further comprising:
    determining the throughput of the network connection during communication of the network traffic based on buffer status of the at least one communication buffer.

19. The at least one non-transitory machine-readable storage medium of claim 17, the operations further comprising:
    determining the RTT based on the packet timing information.

20. An apparatus of a network management entity in at least one communication network, the apparatus comprising:
    means for sensing using network interface circuitry at the network management entity, network traffic on a network connection, the network connection configured between at least a first computing device and at least a second computing device of the at least one communication network;

means for determining at least one characteristic associated with the network traffic on the network connection;

means for identifying a network traffic flow associated with the network traffic, the network traffic flow comprising a plurality of subflows of the network connection;

means for selecting, based on the at least one characteristic of the network traffic on the network connection, a subflow of the plurality of subflows of the network connection and a configuration policy from a plurality of available configuration policies; and means for triggering implementation of the configuration policy on a subset of the network traffic, the subset of the network traffic including network data of the selected subflow of the plurality of subflows, the implementation performed at the network management entity without transmission of the configuration policy to the first computing device and the second computing device.

21. The apparatus of claim 20, further comprising:

means for determining the at least one characteristic using a header information of the network data sensed via the network interface circuitry.

22. The apparatus of claim 21, wherein the header information further comprises multipath flow information, the multipath flow information including a subflow sequence number for each subflow of the plurality of subflows, and wherein the apparatus further comprises:

means for determining the at least one characteristic for each subflow of the plurality of subflows based on the subflow sequence number; and wherein operations to select the subflow are based on the determined at least one characteristic for each subflow of the plurality of subflows.

23. The apparatus of claim 21, wherein the at least one characteristic associated with the network traffic comprises at least one of:

throughput of the network connection during communication of the network traffic; and round trip time (RTT) associated with the network traffic.

24. The apparatus of claim 23, further comprising:

means for buffering; and means for determining the throughput of the network connection during communication of the network traffic based on buffer status of the means for buffering.

25. The apparatus of claim 23, further comprising:

means for determining the RTT based on packet timing information in the header information.

* * * * *